United States Patent [19]
Wilhelmi

[11] 3,722,026
[45] Mar. 27, 1973

[54] CASTER GLIDE
[75] Inventor: Julius B. Wilhelmi, Hull, Mass.
[73] Assignee: TRW Inc., Cleveland, Ohio
[22] Filed: June 17, 1971
[21] Appl. No.: 154,091

[52] U.S. Cl. ................................................ 16/42
[51] Int. Cl. .......................................... A47b 91/06
[58] Field of Search ...248/188.9, 188.8; 16/42, 42 T, 16/43

[56] References Cited

UNITED STATES PATENTS

| | | | |
|---|---|---|---|
| 2,933,754 | 4/1960 | Winans | 16/42 |
| 3,065,494 | 11/1962 | Fontana et al. | 16/42 |
| 3,363,280 | 1/1968 | Le Vasseur | 16/42 |

Primary Examiner—Bernard A. Gelak
Assistant Examiner—Doris L. Troutman
Attorney—Philip E. Parker et al.

[57] ABSTRACT

A caster glide for supporting the hollow tubular leg of a furniture piece. A hollow glide shoe which rests on a floor or floor covering includes a semispherical swivel plate nonrotatably seated in the shoe. Also seated within the shoe and bearing against the undersurface of the swivel plate in the manner of a ball-and-socket joint is the semispherical head of a bolt, the shank of which projects through an opening in the swivel plate and beyond the upper surface of the shoe. The bolt shank is threaded into a nut which seats in the tubular furniture leg and is retained therein by a fastener secured to the nut and bitingly gripping the internal wall of the tubular leg. The nut carries a load bearing means which is disposed beneath the end of the tubular leg when the nut is fully seated therein and is adapted to transmit a load on the furniture piece to the nut, the bolt and the shoe. The shoe is axially adjustable relative to the furniture leg by turning the bolt into or retracting same from the nut and the shoe is pivotal about the ball-and-socket joint of the swivel plate and bolt head for adjusting its angular orientation relative to the bolt to provide flush seating on the floor or floor covering. The bolt and swivel plate embody cooperating wrenching means which positively engage to insure effective turning of the bolt responsive to rotation of the shoe.

6 Claims, 3 Drawing Figures

PATENTED MAR 27 1973

3,722,026

INVENTOR
JULIUS B. WILHELMI
BY
James R. O'Connor
ATTORNEY

CASTER GLIDE

BACKGROUND OF THE INVENTION

1. Field of the Invention

The invention relates generally to hardware of the type found in U.S. Art Class 46, Subclass 42, entitled "Casters — Sliding," and more particularly to furniture glides wherein the shoe or support engaging element is angularly adjustable for flush seating on a floor and is also axially adjustable relative to the leg of a supported furniture piece to effect proper leveling.

2. Description of the Prior Art

The patented prior art includes numerous disclosures of furniture glides wherein the foot or floor engaging member tilts or swivels relative to the axis of the supported furniture leg to achieve flush seating of the base of the foot against a supporting structure in situations wherein the leg is not oriented perpendicularly to the supporting structure. The patented art will also apprise one of a number of furniture glides which are axially adjustable relative to a furniture piece leg for leveling purposes. Earlier disclosures of glides which are both axially and angularly adjustable relative to the supported furniture piece leg are, however, few in number. One such disclosure, which will be further discussed hereinafter, is U.S. Pat. No. 3,366,991 (R. F. Le Vasseur).

As is exemplified by the teachings of U.S. Pat. Nos. 2,640,219 (P. D. Becker); 2,973,545 (M. Kramcsak, Jr.); 3,065,494 (F. J. Fontana et al.); and 3,166,782 (R. E. Miller), it has long been the practice in the art to utilize a sheet metal, spring retainer having an umbrella shape and a plurality of peripheral, spaced prongs (often referred to in the fastener trades as "grip plates") to secure the supporting post, stem or bolt component of the glide to a tubular furniture leg. This has proved to be an efficient and economical approach to glide mountings, particularly with glides according to the last mentioned group of patents which are not capable of axial adjustment and where the inside diameter of the engaged tubular leg is in excess of three-fourths inch. The reader will readily appreciate, however, that the use of grip plate type fasteners with narrower gage tubing leads to a reduction in the load supporting capability of a glide in that the size of the grip plate itself must be substantially reduced and the diameter of the supporting stem, post, bolt, etc., which is normally seated in a central opening in the body of the grip plate, must likewise be reduced, otherwise the diameter of the said opening begins to approach the over-all diameter of the grip plate and there is, in effect, hardly anything left of the body of the plate per se. The situation becomes still further aggravated when the grip plate must receive and be secured to a nut which will cooperate with a supporting bolt to render the glide axially adjustable. Thus, one object of the present invention is to provide an improved glide mounting or fastening arrangement which is particularly adapted for use with narrow gaged tubing and permits the continued utilization of supporting bolts having diameters equal to or not substantially less than those utilized with larger tubing whereby the load bearing capacity of the glide is not impaired.

Another object of the invention is to provide an improved axially adjustable glide for use with relatively narrow gage tubing.

A still further object of the invention is to provide a glide that satisfies the aforementioned objectives with a fastener which retains the desirable internal gripping of the supported furniture leg that is characteristic of the known grip plate mountings.

The prior art glides, including those disclosed in the aforementioned patents, are likewise generally characterized by a ball-and-socket joint comprising a spherical or semispherical head on the supporting bolt, stem or post, etc., and a complementary spherical or semispherical seat in the glide shoe structure to facilitate angular adjustment of the shoe relative to the supported leg. One will of course recognize that this type of joint, specifically selected to facilitate swivel of the glide shoe, inherently permits relatively free rotation of the mating parts forming the ball-and-socket joint relative to one another. When one is not concerned with a glide adapted for rotary axial adjustment, this relative rotation presents no particular problem. To the contrary, in a glide designed for axial adjustment such as that disclosed by Le Vasseur, relatively free rotation between the glide shoe and the bolt head inhibits effective adjustment of the bolt in that the shoe when turned simply slips on the bolt head and the bolt does not axially advance or retract as the case may be with respect to the leg of the supported furniture piece. Le Vasseur recognized this problem and sought to remedy it by providing increased frictional resistance to relative rotation and to that end incorporated a slot in the bolt head and/or spaced ribs on the semispherical surface of the head, the edges of which would allegedly dig into the softer material of the socket in the foot housing the bolt head and thus restrict relative rotation between the mating parts.

It is another object of the present invention to provide an axially adjustable glide which is still further improved in the aforementioned aspect through the incorporation of cooperating wrenching elements in the glide shoe and bolt, which wrenching elements positively engage to insure effective advancement or retraction of the bolt responsive to rotation of the shoe, but to not in any way inhibit the capability of the shoe to tilt or swivel about the bolt head to the extent desired.

Additional objects, advantages and contributions to the art of the present invention will become evident from a reading of the detailed description of a preferred embodiment of same which follows in conjunction with a viewing of the accompanying drawing.

DESCRIPTION OF A PREFERRED EMBODIMENT

Figure 1:
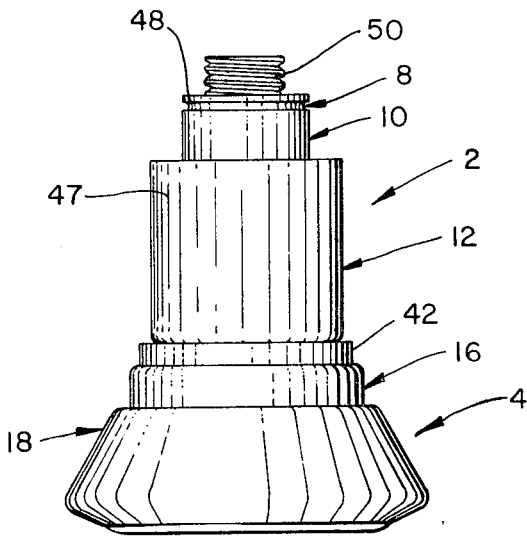
FIG. 1 is a side elevational view of a furniture glide according to the invention depicting the shoe of the glide turned up against the undersurface of the nut member thereof.

An improved furniture glide 2 according to the invention includes five major components, to wit, a shoe assembly 4, a bolt 6, a nut 8, a sleeve 10 and a ferrule 12.

The shoe assembly 4 comprises a metallic base 4 which rests on a floor or floor covering during normal usage of the glide, a resilient cushion 16 of rubber or a relatively soft synthetic plastic construction which is secured to the base plate by a peripheral metallic clamp 18, and a swivel plate 20. The cushion 16 is hollow in that it has a cavity formed in its underside, which cavity has an enlarged lower section defined by a peripheral wall 22 having an irregular octagonal configuration and a narrower upper section communicating with the lower section and defined by a semispherical peripheral wall 24, and a funnel-shaped opening 26 extending through its upper end in open communication with the semispherical section of the cavity. The metallic swivel plate 20 has a semispherically-shaped body 28 which is seated in the correspondingly shaped section of the cavity in the cushion and a peripheral flange 30 extending radially from the lower end of said body portion which is seated in the enlarged lower section of the cavity. The flange 30 also has an irregular octagonal configuration and engages the peripheral wall of the cavity so as to render the swivel plate nonrotatable with respect to the cushion. The upper end of the body 28 of the swivel plate has a rectangular opening 32 formed therein in registration with the opening 26 in the cushion. The swivel plate is of course assembled with the cushion 16 prior to the clamping of the cushion to the base plate 14.

Figure 3:
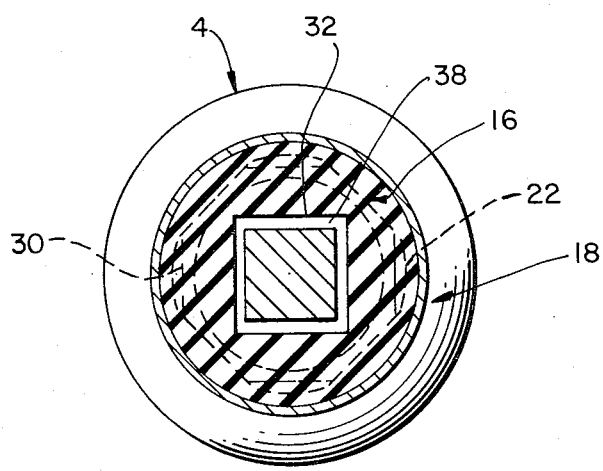
FIG. 3 is a cross section taken on line 3—3 of FIG. 2.

Bolt 6 has a semispherical head 34 seated within the cavity in the cushion 16 with the crown of the head resting on base plate 14 and the periphery of the head bearing against the inner wall of the body 28 of the swivel plate. The shank 36 of the bolt extends through the aligned openings 32 and 26 in the swivel plate and cushion, respectively, and carries a rectangular shoulder portion 38 located adjacent the head and disposed within said openings. The bolt must likewise be assembled with the shoe prior to the clamping of the cushion to the base plate. As is best seen in FIG. 3, the transverse cross sectional area defined by the shoulder 38 on the bolt is less than the area defined by the opening 32 in the swivel plate to permit the shoe to pivot or tilt angularly about the bolt head to a limited extent against the bias of the resilient cushion to effect flush seating of the foot base on a floor when the axis on the supported furniture leg lies at other than perpendicular to the floor. The threaded upper end of the bolt shank 36 is coupled to the nut 8 which includes an internally threaded, elongated barrel 40 and a radially extending, peripheral flange 42 at one end of the barrel.

Cylindrical sleeve 10 is disposed about the outer wall of the nut barrel 40 and carries a plurality of resilient, barb-like projections 44 struck from the body of the sleeve and extending downwardly toward the flange 42 of the nut. Open-ended ferrule 12 has an inwardly and upwardly turned lip 46 at the lower end thereof and a shell 47 extending from the lip upwardly in spaced circumscribing relationship to the nut barrel 40 and sleeve 10 disposed thereon.

In assembling and securing the components of the upper section of the glide, the nut barrel 40 is first passed through the opening defined by the lip 46 in the lower end of the ferrule until the ferrule comes to rest against the flange 42 of the nut. The nut barrel 40 is then inserted into and through the sleeve 10 until the lower end of the sleeve engages the upper inboard edge of the lip 46 of the previously assembled ferrule. Subsequently, the upper end of the nut barrel is flared outwardly at 48 to insure retention of the sleeve and ferrule on the nut barrel 40. The shoe and bolt are then coupled to the upper glide section by turning the bolt into the nut to the maximum extent possible (see FIG. 1) and the lead threads 50 on the bolt are slightly upset or deformed to permanently connect the upper and lower guide sections and limit bolt retraction to the extent depicted in FIG. 2.

Figure 2:
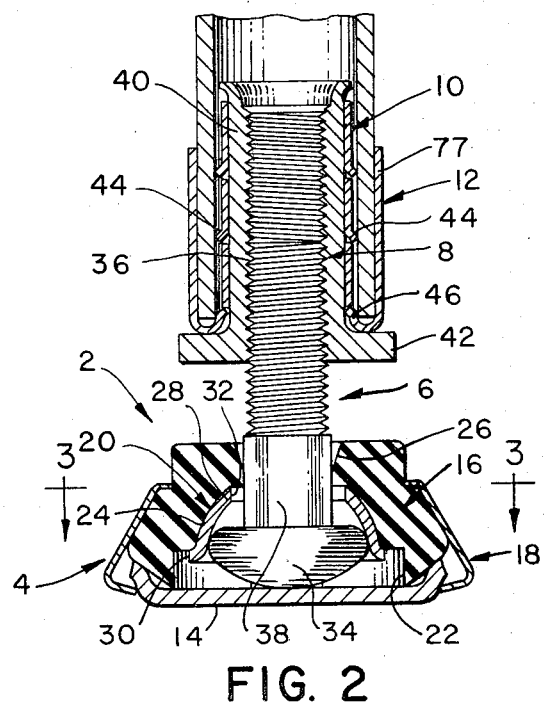
FIG. 2 is a cross sectional view of the glide depicted in FIG. 1 in assembly with a fragmentary portion of the tubular leg of a furniture piece with the glide shoe retracted to the maximum extent.

The coupling of the glide to the tubular furniture leg 52 is effected by turning the shoe 4 up against the nut flange 42 (i.e. the FIG. 1 position), inserting the upper end of the nut barrel 40 into the furniture leg and striking the base plate 14 of the glide with a hammer or other appropriate tool to cause the leg to descend into the cap between the shell 47 of the ferrule and the sleeve 10 until the leading edge of the leg bottoms on the lip 46 of the ferrule. During assembly the projections 44 on the sleeve deflect slightly inwardly as the furniture leg is driven home and thereafter bitingly grip the internal wall of the sleeve, as depicted in FIG. 2, to securely retain the leg and glide in assembly. It has been found that eight generally equally spaced projections on the sleeve will provide sufficient strength in the fastening in most applications but the gripping action may of course be further enhanced by providing additional barbs on the sleeve so long as the over-all sleeve structure is not unnecessarily weakened. In the final assembly the nut flange 42 is disposed beneath the leading end of the furniture leg and provides a load bearing means for transmitting a load on the furniture piece to the nut, bolt and shoe.

One who now proceeds to compare the improved glide-to-leg fastening arrangement of the present disclosure with the grip plate attachments of the earlier mentioned patents will immediately recognize that the sleeve 10 and projections 44 thereon fill only a minimal amount of the over-all internal diametral extent of the tubular leg and thus permit the utilization of larger nuts and bolts with narrow gage tubing than would be possible with a grip plate type fastener. Thus, since the size of the supporting bolt need not be decreased proportionally as the tubing gage decreases, greater support for the furniture piece is realized.

One will also readily recognize that leveling adjustment of the glide may be easily effected by grasping the shoe 4 and turning same in the desired direction whereby the corners of the shoulders 38 on the bolt shank will positively engage the flats of the swivel plate edges defining opening 32 therein (after a very limited amount of lost motion travel) to precipitate an immediate rotation of bolt 6 and advance the shoe toward or away from the furniture leg as the case may be. Moreover, the novel wrenching means designed to insure turning of the bolt responsive to rotation of the shoe do not in any way inhibit pivoting or tilting of the glide shoe relative to the bolt head as is the case with friction increasing means between the mating parts incorporated to resist relative rotation.

Having considered the foregoing detailed description of a preferred embodiment of the invention, one should proceed to a consideration of the claims which follow for a determination of the scope of the invention protected by these Letters Patent.

I claim:

1. In combination with a furniture piece having a tubular leg, a caster glide comprising: a hollow shoe which rests on a floor or floor covering, said shoe having an opening extending through the upper end thereof and including a generally semispherical swivel plate seated therein and having a polygonally-shaped opening communicating with the said opening in said shoe; a bolt including a head having at least a part spherical contour seated in said hollow shoe and bearing against said swivel plate in the manner of a ball-and-socket joint, a shank projecting upwardly from said head through the communicating openings in said swivel plate and said shoe and beyond the upper surface of said shoe, and a polygonally-shaped shoulder on the portion of said bolt shank passing through said opening in said swivel plate whereby the internal edges of said swivel plate defining said opening therein and the external surfaces of said shoulder are adapted to be positively engaged responsive to a turning movement of said shoe to thereby provide cooperating wrenching means which facilitate effective turning of said bolt responsive to rotation of said shoe; a nut seated in the tubular leg of the furniture piece and retained therein by fastener means disposed adjacent the outer peripheral wall of said nut and gripping the internal wall of the tubular leg, said bolt shank being threaded into said nut; support means joined to said nut and disposed beneath the lower edge of the tubular leg for transmittal of a load on said leg to said nut and said bolt and said shoe, said shoe being vertically adjustable relative to the furniture leg by advancing said bolt into or retracting said bolt from said nut responsive to rotation of said shoe and said shoe being pivotal about the ball-and-socket joint of said bolt head and swivel plate for adjusting the angle orientation of the shoe relative to the bolt.

2. The combination according to claim 1 wherein said shoe includes a base plate, a resilient cushion secured to said base plate, said cushion having a cavity formed in the underside thereof and an opening formed in the upper end thereof in communication with said cavity, said swivel plate being non-rotatably seated in said cavity with the opening in said swivel plate in registration with the said opening in said cushion, said bolt head being disposed within the said cavity in said cushion and bearing against said base plate, and the shank of said bolt extending through the said opening in said cushion.

3. The combination according to claim 1 wherein said nut includes an elongated, threaded barrel disposed within the tubular leg of the furniture piece and a radially extending flange at one end of said barrel, said flange constituting the said support means disposed beneath the lower edge of the tubular leg.

4. The combination according to claim 3 wherein said fastener means comprises a sheet metal sleeve secured to the said barrel of said nut and having a plurality of barblike projections struck outwardly therefrom, said projections being in biting engagement with the internal wall of the tubular leg.

5. The combination according to claim 4 including a ferrule having an inturned lip at one end thereof secured to and bearing against the said radial flange on said nut and an open-ended shell extending upwardly from said lip and circumscribing said nut barrel and said sheet metal sleeve in laterally spaced relationship thereto, the end of the tubular furniture leg being seated in the gap between said shell and said sleeve and bearing against said lip in such a manner that the shell tends to clamp the leg against the projections struck from said sleeve.

6. The combination according to claim 1 wherein said opening in said swivel plate is enlarged relative to the transverse cross sectional area of said shoulder on said shank to permit pivotal movement of said shoe relative to said bolt.

* * * * *